Sept. 7, 1937.  I. MATTHEWS  2,092,464
METHOD OF MAKING ARTIFICIAL FLOWERS
Filed Aug. 15, 1935   2 Sheets-Sheet 1
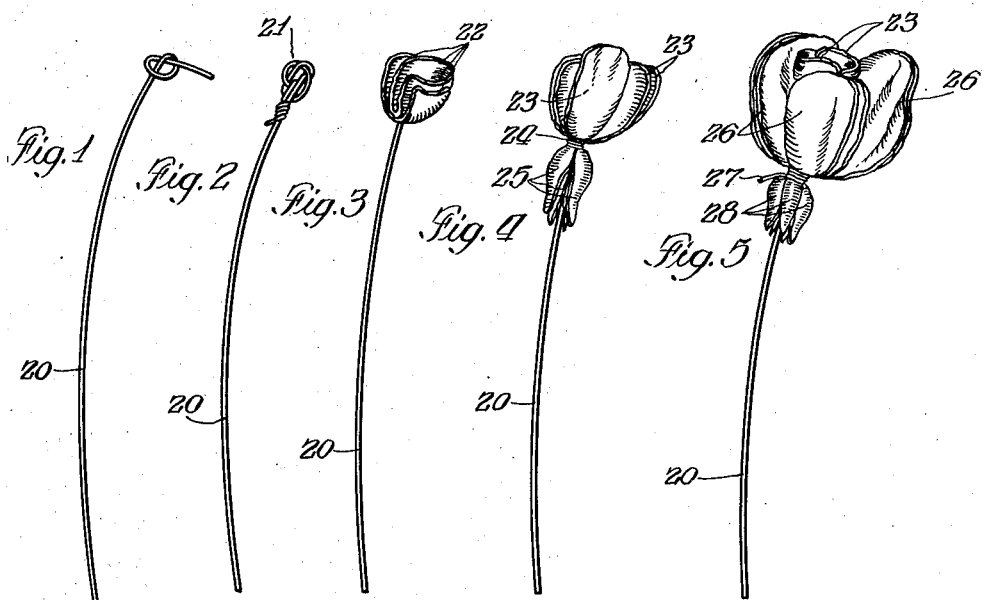
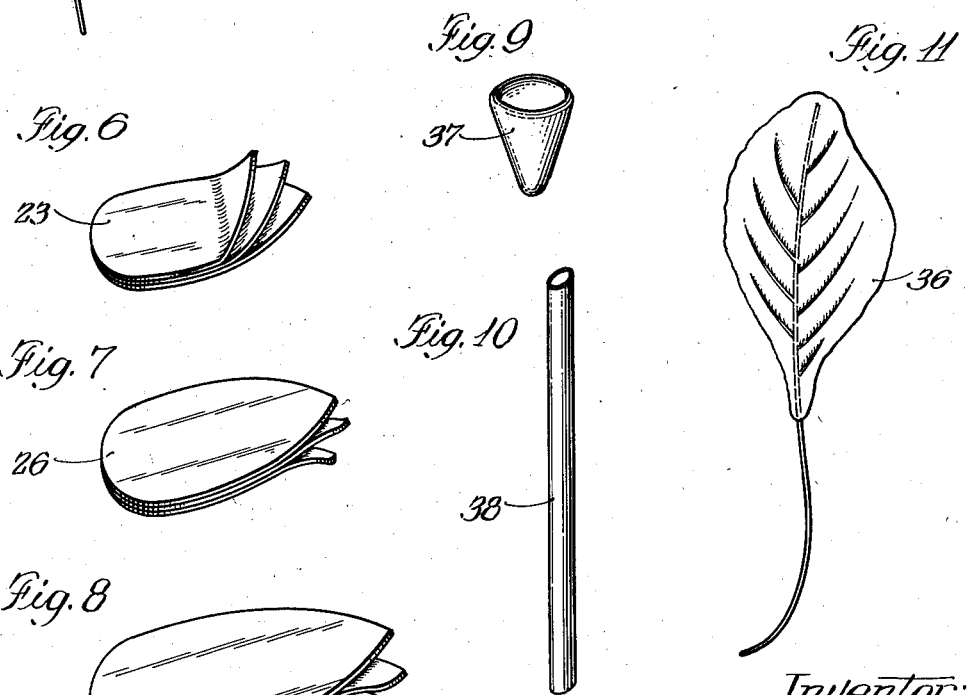
Inventor:
Inez Matthews.
By: Brayton G. Richards
Attorney.

Sept. 7, 1937.  I. MATTHEWS  2,092,464
METHOD OF MAKING ARTIFICIAL FLOWERS
Filed Aug. 15, 1935  2 Sheets-Sheet 2

Inventor:
Inez Matthews.
By: Brayton W Richards
Attorney.

Patented Sept. 7, 1937

2,092,464

UNITED STATES PATENT OFFICE 2,092,464

METHOD OF MAKING ARTIFICIAL FLOWERS

Inez Matthews, Oakland, Calif.

Application August 15, 1935, Serial No. 36,417

2 Claims. (Cl. 41—13)

The invention relates to improvements in artificial flowers and methods of making the same, the primary object being the provision of an improved article and method of the character indicated whereby artificial flowers of great beauty and naturalness may be readily and economically produced.

Another object of the invention is the provision of an improved method of the character indicated which will result in the production of artificial flowers closely approaching in appearance various natural flowers.

Another object of the invention is the provision of an improved form of petal for artificial flowers which greatly facilitates the production and natural appearance thereof.

Other objects will appear hereinafter.

The invention consists in the artificial flower and method of producing the same hereinafter described and claimed.

Figure 12:
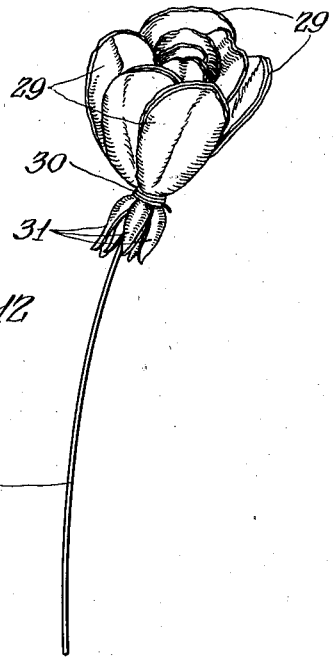
Figure 13:
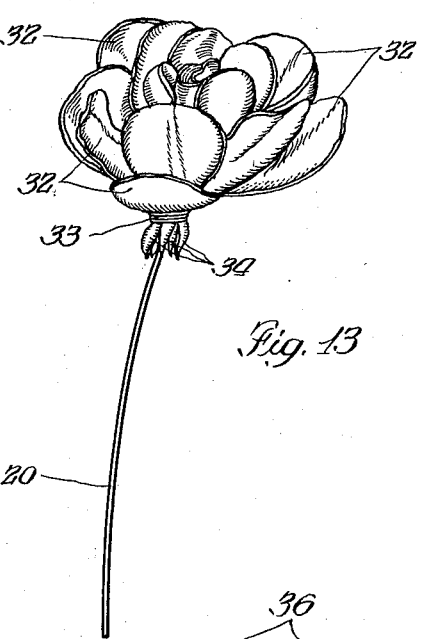
Figure 14:
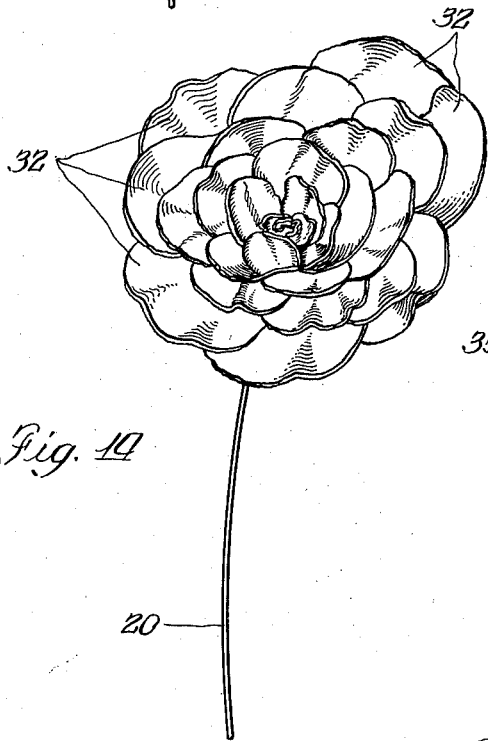

The invention will be best understood by reference to the accompanying drawings forming a part of this specification, and in which Fig. 1 is a view of a stem wire employed in the flower and shown in an initial stage of production;

Fig. 2 a view of the stem wire in a later stage;

Fig. 3 a view of said wire in a later stage with the beginnings of the central body of the flower applied thereto;

Fig. 4 a similar view showing the same with the first layer of petals applied thereto;

Fig. 5 a similar view showing the same with a second layer of petals applied thereto;

Fig. 6 a perspective view of the form of petal shown as applied in Fig. 4;

Fig. 7 a perspective view of the form of additional petal shown as applied in Fig. 5;

Fig. 8 a perspective view of larger additional petals;

Fig. 9 a perspective view of a conical binding employed in a later stage of the construction;

Fig. 10 a perspective view of a rubber tube employed in the last stage of construction;

Fig. 11 a view of a calyx leaf employed in a late stage of the construction;

Fig. 12 a perspective view similar to Fig. 5 but showing the flower with additional petals added;

Fig. 13 a view similar to Fig. 12 but showing still additional petals added;

Fig. 14 a view similar to Fig. 13 but showing additional petals added; and

Figure 15:
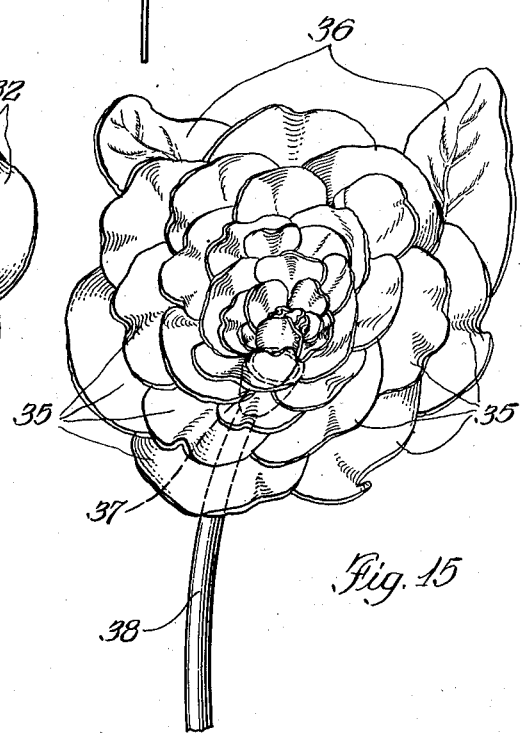

Fig. 15 a view of a completed flower.

In making up the flower, a length of wire 20 is first selected and an enlargement in the form of a complicated knot 21 is formed at one end thereof, as shown in Fig. 2. Then the wire is threaded centrally through one or more sheets 22 of suitable imitative material and said sheets are supplied with suitable adhesive and are compressed, folded and adhesively secured about the knot 21 to form a central body or bud-like body imitative of the central stamen of the flower. Each of the sheets 22 is preferably formed of three sheets of vegetable plant fiber material adhesively secured together. Two petals 23 are thereupon arranged as shown in Figs. 4 and 6 around and on opposite sides of said central body with their lower narrow ends 25 extending along the stem wire 20 and bound thereto by means of a binding wire 24. Before assembling of the petals 23, each is provided with adhesive at the binding point so that each petal will be secured in place both adhesively and by a binding at a point just below the said central body.

Then an outer layer of somewhat larger petals 26 are secured as indicated around the petals 23 in an outer layer in spaced relation to each other and to the petals 23, being secured in place by adhesive and binding 27 with their ends 28 extending as shown along the wire 20. Similarly, the larger petals 29 are applied and secured in place in a successive layer in spaced relation around the petals 26, being also adhesively secured in place and bound by the wire 30 with projecting inner ends 31. Then still larger and similar petals 32 are similarly secured and bound around the petals 29 by adhesive and the binding 33 with inwardly extending ends 34, as illustrated in Fig. 13. Additional petals 32 are similarly added, as indicated in Fig. 14, and additional outer layers of still larger petals 35 are also similarly added and secured, as indicated in Fig. 15.

Calyx leaves 36 are also added and have their stems secured in place by suitable binding. If desired, the various bindings for the different petals and leaves may be one continuous wire or separate wires, as desired.

Then a conical base member 37 is threaded over the wire 20 and placed over the projecting inner ends of the petals, as indicated by dotted lines in Fig. 15, and a rubber tube 18 is placed over the remaining portion of the wire 20, thereby completing the flower. Each of the petals, as well as the sheets for the central body, are preferably made of three thicknesses of thin flat sheets of vegetable-plant fiber adhesively secured together by a suitable adhesive, and of such a character as to be materially affected by a cool temperature so that when placed in an icebox said petals will contract and alter their shape to apparently revive and freshen in appearance, being therefore known and designated as "icebox" flowers.

Obviously, the various petals employed may be of various sizes, shapes and configurations so as to imitate artistically the appearance of the petals of various well known flowers and thereby enable the producer to produce completed flowers closely resembling various natural flowers. In producing this resemblance, the petals may be given a final artistic shaping or appearance by delicately pinching and twisting the same between the fingers, a little adhesive applied to the edges thereof tending to facilitate this procedure.

While I have illustrated and described the preferred form of construction of the flower and method of making the same, these are capable of modification and variation without departing from the spirit of the invention. I therefore do not wish to be limited to the precise details disclosed but desire to avail myself of such variations and modifications as fall within the scope of the appended claims.

I claim:

1. The method of making artificial flowers which consists in first forming an enlargement at one end of a wire; then passing said wire through a substantially flat imitative sheet, and folding and adhesively securing the ends of said sheet around said enlargement; then placing the inner ends of individual petal shaped sheets around said enlargement and binding said inner ends to said wire at a point under and adjacent said enlargement; and then similarly adding additional outer petal shaped leaves.

2. The method of making artificial flowers which consists in first forming an enlargement at one end of a wire; then passing said wire through a substantially flat imitative sheet and folding and adhesively securing the ends of said sheet around said enlargement; then placing the inner ends of individual superposed sheets of petal shaped sheets around said enlargement and binding said inner ends to said wire at a point under and adjacent said enlargement; and then similarly adding additional outer petal shaped leaves.

INEZ MATTHEWS.